United States Patent Office 3,619,971
Patented Nov. 16, 1971

3,619,971
CONDITIONING METHOD AND APPARATUS FOR CARRYING IT INTO PRACTICE
Rene Claude, Sevres, France, assignor to Centre de Recherches Marcel Midy, Paris, France
No Drawing. Filed June 9, 1969, Ser. No. 831,717
Int. Cl. B65b 3/04
U.S. Cl. 53—37                                    1 Claim

ABSTRACT OF THE DISCLOSURE

New conditioning method for use particularly in the pharmaceutic field, characterized in that a gelatin capsule is used in which is introduced, in the fused or unfused state, a mixture of at least one active compound and at least one non-oxidable fatty substance, of which the melting point is between about 30 and 40° C.

---

The present invention relates to a new conditioning method, particularly utilizable in the pharmaceutical industry for conditioning substances which are liable to be altered by oxygen, oxidizing products or water.

It is already known to condition powders in rigid gelatine capsules (called force-fitted medical capsules); it is also known to condition the liquids in soft gelatine capsules (or medical capsules proper). But the water residual content of the capsule, its permeability to air and, in some cases, the difficulty of uniformly distributing very small quantities of active substance in a relatively large powder volume prevent this conditioning method from being utilized for a great number of products.

The present invention makes it possible to overcome these various difficulties, and to use gelatin capsules conditioning for a greater number of products.

The present invention also relates to a new conditioning method, characterized in that at least one active compound and at least one non-oxidable fatty substance mixture, in the fused or super cooled state is included in the gelatin capsule.

The non-oxidable fatty substances according to the invention are primarily saturated fatty substances. A pure fatty substance or a mixture of fatty substances or derivatives of these fatty substances may be used. These fatty substances or derivatives are preferably selected among the semi-synthetic glycerides, cocoa butter and hydrogenated fats. Semi-synthetic glycerides are known hydrogenated excipients for manufacturing suppositories.

The intervals between melting and solidification points of fatty substances and other components of the composition are important for avoiding thermal alteration of the active principles to be distributed.

Thus, it is possible to use fatty substances and other constituents of the composition having a fusion point interval between about 30 and 40° C.

Other constituents of the composition may be $C_{10}$ to $C_{18}$ saturated fatty alcohol condensates, silicones supplying water repellent properties, and reinforcing protection of active principles against humidity, the fluid and solid paraffinic compounds and charges and usual excipients for pharmaceutical compositions.

The above-mentioned classes of preferred compounds for carrying out the method are cited as non-limitative examples.

According to the invention, the mixture of fatty substances and active principles is directly distributed in gelatin capsules, when the fatty substance is in the fused or super cooled state at a temperature compatible with thermal stability of the active principle contained in the fatty substance and with thermal and dimensional stability of gelatine.

In order to effect this operation, one preferably uses a plate of one of the apparatuses presently known for conditioning powder in capsules. Said plate includes all the processing stations which are necessary for manufacturing the gelulas containing the powder to be conditioned i.e. the processing stations for filling, sealing and ejecting the gelatin capsules. It is also possible to include in these processing stations a member ensuring a sealed closing of the capsules, for example by welding the two halves of the gelatin capsules or by using any other known means.

The plate shall be supplied by at least one device similar to that which is presently used in the automatic volumetric machines such as, for example, those for volumetrically filling the suppository moulds; such a device shall include for example:

(a) A container, the temperature of which is set at an adjustable level, provided with a stirrer and comprises, if necessary, protections against pollution of its content against air, humidity or atmospheric pollution agent.

(b) An ejector, controlled by a distributing pump, operating in connection with the plate which delivers in each opened gelatin capsule the suitable amounts of mixture, fused or super cooled, of fat substance and active principles.

Such a conditioning method may be used for solving a number of problems, particularly in the field of pharmaceutics; such as:

(1) Products which are very sensitive to humidity, such as:

lyophilized products in general;
hydroscopic antibiotics, such as penicillin;
live germs, such as lactobacillus;
hygroscopic vitamins, such as $B_{12}$ vitamin;
vegetal extracts, such as hygroscopic nebulisates which stick when handled;
opotherapic extracts (dry powders of organic parts, bones, glands, etc.);
enzymes, such as chymotrypsine, trypsine, etc.

(2) Products to be taken in very small quantities, perfectly proportioned, which involves a very uniform distribution in the excipient; this is the case for medicaments containing hormones, for example.

(3) Products sensitive to air oxidation such as vitamins A and D for example.

(4) Products normally incompatible, but which, when embedded in the fatty substances used, are isolated from each other by means of said fatty substances.

Each capsule can of course contain a single type of mixture (fatty substance plus active principles) or may contain several of them which may be introduced successively in the capsule or may contain a mixture of fatty substances, active principles such as previously described, and a non-labil powder (to humidity or oxidation, etc.).

What I claim is:

1. In a method for filling and sealing in rigid force-fitted telescoping sealed or welded two-piece pharmaceutical gelatine capsule halves an active medicinal product, sensitive to humidity and/or air oxidation, the improvement which consists of the following steps carried out automatically in a processing device:

(a) preparing a uniform mixture of an active medicinal product with a melted fatty substance having a melting point between about 30° C. and 40° C., selected from the group consisting of hydrogenated fats and semisynthetic glycerides, at a temperature compatible with the thermal stability of said active medicinal product and the thermal dimensional stability of gelatin, (b) delivering to each opened capsule from a container which protects the contents from air and humidity a measured amount of said uniform mixture of melted fatty substance and active medicinal product at a temperature compatible with the thermal stability of the active ingredient and of gelatin, (c) welding together or sealing the two capsule halves, and (d) ejecting the filled capsules.

References Cited

UNITED STATES PATENTS

| | | | |
|---|---|---|---|
| 2,624,164 | 1/1953 | Donofrio | 53—184 X |
| 2,630,953 | 3/1953 | Kath | 53—281 |
| 2,936,493 | 5/1960 | Scherer | 53—281 X |
| 3,374,146 | 3/1968 | Blicharz et al. | 424—19 |
| 3,421,282 | 1/1969 | Hasegawa et al. | 53—4 |
| 3,456,051 | 7/1969 | Mima et al. | 424—37 |

FOREIGN PATENTS

| | | | |
|---|---|---|---|
| 1,217,024 | 5/1966 | Germany | 53—281 |

THERON E. CONDON, Primary Examiner

R. L. SPRUILL, Assistant Examiner

U.S. Cl. X.R.

424—37